Dec. 10, 1929.  W. L. FRY  1,738,769
BRAKE LOCKING DEVICE
Filed Oct. 6, 1925   2 Sheets-Sheet 1
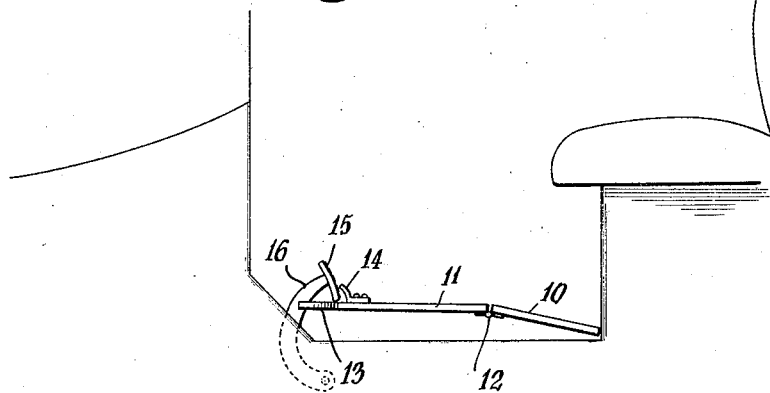
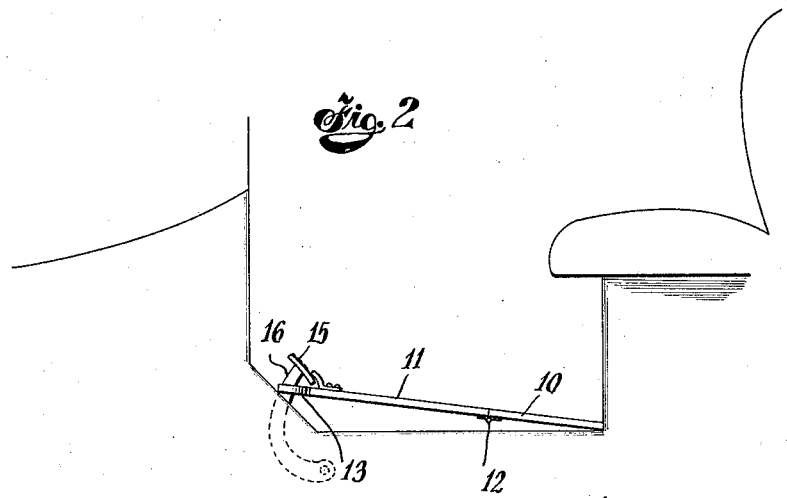
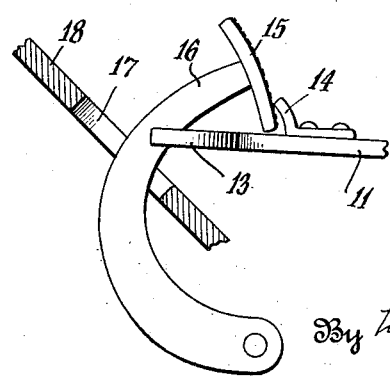
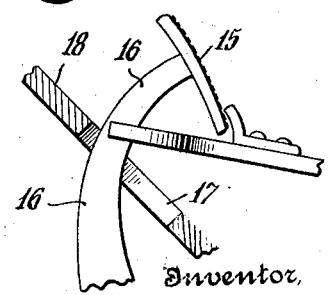
Inventor,
Walter L. Fry
By his Attorney
Ramsay Hoguet

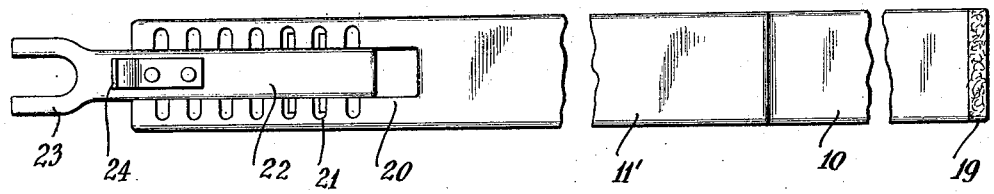
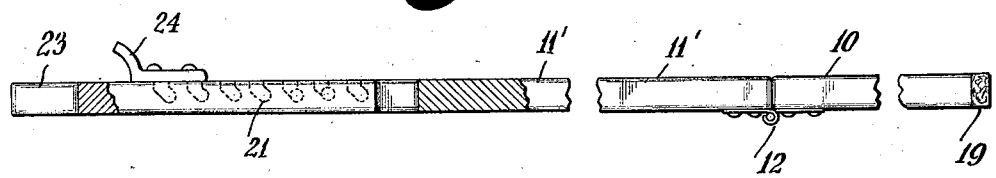
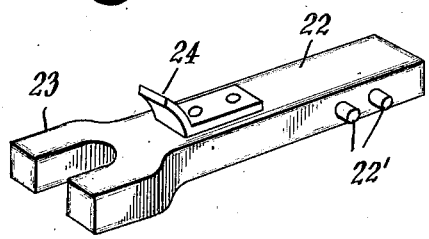
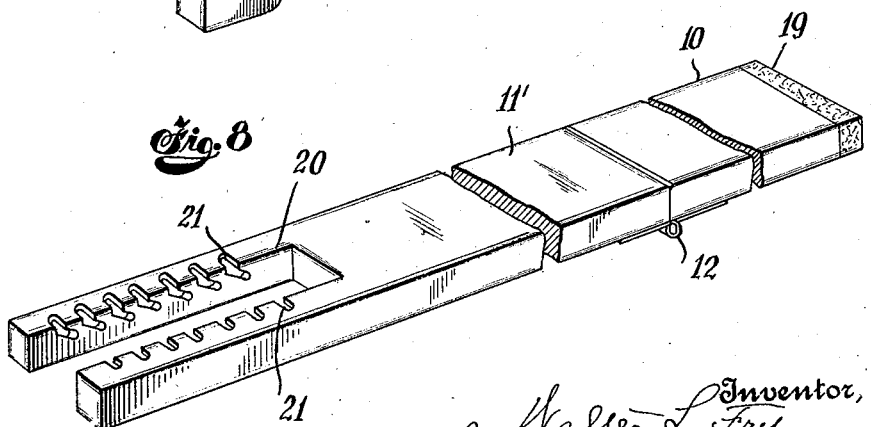

Patented Dec. 10, 1929

1,738,769

UNITED STATES PATENT OFFICE

WALTER L. FRY, OF NEW YORK, N. Y.

BRAKE-LOCKING DEVICE

Application filed October 6, 1925. Serial No. 60,816.

My invention is adapted for use on motor cars for locking the brakes in a set position during certain operations. In adjusting brakes on a motor car, it is customary for a person to sit on the seat of the car, apply his foot to the brake lever and hold the brakes set while force is applied to turn the wheels against the resistance of the brakes. This force is measured and enables the brakes to be evenly adjusted. It will be seen that when this is done it requires the time of the person applying the brakes and the pressure is likely to be more or less uncertain. My invention is intended to produce a simple locking member or device which can be applied to the foot lever or brake lever when the brakes are set and which will hold the brakes in said set position. My invention is intended to produce a very simple device of this kind which can be readily applied to the usual brake lever, and my invention is also intended to produce a simple form of locking device which can be adjusted readily as to length to enable it to fit different makes of cars.

The usual application of the device is to set the brakes then place the locking member which is in the form of a locking arm between the brake lever and some fixed abutment, as for example, the front portion of the seat support. I prefer also to make this locking member of hinged parts so that it will act like a toggle and by placing it between the lever and abutment in a slightly bent position, then straightening it out by pressure on the joint, the member will stay straight and securely lock the brake lever in its set position. This will be better understood from the following description.

Reference is to be had to the accompanying drawings forming a part of this specification, in which similar reference characters indicate corresponding parts in all the views.

Figure 1 is a side elevation of my improved device showing its application to a brake lever and with the locking member in unstraightened position.

Figure 2 is a similar view, but with the locking member straightened out.

Figure 3 is an enlarged detail, showing how the locking device engages the foot or brake lever.

Figure 4 is a view similar to Figure 3 but with the parts in a different position.

Figure 5 is a broken plan view of a modified and preferred form of the device which renders it adjustable.

Figure 6 is a broken side elevation of the structure shown in Figure 5.

Figure 7 is a detailed perspective view of the lever engaging tongue of the device.

Figure 8 is a broken perspective view of the body portion of the locking member.

In its simplest form, the locking member is composed of two hinged parts 10 and 11 united at the abutting ends by a hinge 12. The part 11 can be bifurcated and widened at its front end as shown at 13 so as to partly straddle and engage the foot lever 16 which is the conventional lever for setting brakes and the member 11 has also preferably thereon and on the upper side a fixed shoe 14 which is adapted to engage the foot plate or pedal 15 of the lever 16. In operation, the locking member can be placed between the lever 16 and the base of the car seat as shown in Figure 1, and the lever 16 may be pushed forward and downward in the customary way, after which the locking member is straightened out as in Figure 2 and will hold the lever 16 in its forward and downward position which is assumed when the brakes are set.

To make the device applicable to all makes of cars, I prefer to have it adjustable as to length, and in this case the form shown in Figures 5 to 8 is useful. I show also a cushion end 19 for the member 11 to guard against marring the part of the car with which it comes in contact and the member 11' is bifurcated towards its free end, as shown at 20, to receive an adjustable extension or tongue 22. To facilitate adjustment the side walls of the bifurcation 20 are shown provided with teeth 21 to receive pins 22' on the sides of the tongue 22 and by placing these pins in the desired notches or teeth 21, obviously the length of the device as a whole can be regulated. It will be evident that other means can be used for making the device extensible or for locking the tongue in place without affecting the invention.

The tongue or extension 22 has its outer end preferably in the shape of a fork 23 to engage the lever 16, and it also has a shoe 24 thereon acting like the shoe 14 already referred to, to engage the pedal 15. The action of the modified form of the structure is previsely as indicated, except for the adjustable feature. The tongue 22 is adjusted as described, and when the brake lever is pushed forward the locking member is placed between the seat and the lever 16, and the locking member straightened out as described, thus securely locking the lever and holding the brakes set.

The foregoing illustrates simple and preferred forms of the device, but from the description given it will be seen that many other forms of a removable locking device, extending between the brake lever and a fixed abutment on the car can be designed without departing from the principle of this invention, which while simple in form, saves the time of a person holding the brake set and also holds the brakes steadily and more securely than would an individual.

I claim:

1. A brake locking device for motor cars comprising a locking member of two sections hinged together, one being adapted to engage an abutment and the other having its end shaped to engage the brake lever of the car, and means on said member for engaging the foot pedal of the car to retain said member in position.

2. A brake locking member for motor cars having a bifurcated end to engage the brake lever and means adjacent said bifurcated end to engage the foot pedal of the car to retain said locking member in position, said locking member being of a length to extend from the brake lever to an abutment.

3. A brake locking device for motor cars comprising a member adapted to be arranged between the brake lever of the car and an abutment and provided with a freely removable tongue, means on the said member for holding said tongue in a predetermined position whereby the free end of the tongue engages said brake lever, and means secured to said tongue for engaging the foot pedal to retain the member in position.

4. A brake locking device for motor cars comprising a member arranged to extend between the brake lever of the car and an abutment, said member having a bifurcated end, keys in said end, and a tongue adjustably held in the said keys and having its free end shaped to engage the aforesaid brake lever.

5. A brake locking device for motor cars comprising hingedly connected members one of which has a manually adjustable extension shaped to engage the brake lever of the car to rigidly retain said lever in a predetermined position and means engaging the foot pedal to position the device.

6. A brake locking device for motor cars comprising a member arranged to extend between the brake lever of the car and an abutment, said member having a bifurcated end, keys in said end, and a tongue adjustably held in the said keys and having its free end shaped to engage the aforesaid brake lever, and means secured to said tongue to engaging the foot pedal to retain said member in position.

In testimony whereof, I have signed my name to this specification this 5th day of October, 1925.

WALTER L. FRY.